June 8, 1965
W. E. SHANN
3,187,972
APPARATUS FOR AUTOMATICALLY INSERTING
ELECTRICAL COMPONENTS
Filed Feb. 27, 1963
11 Sheets-Sheet 5
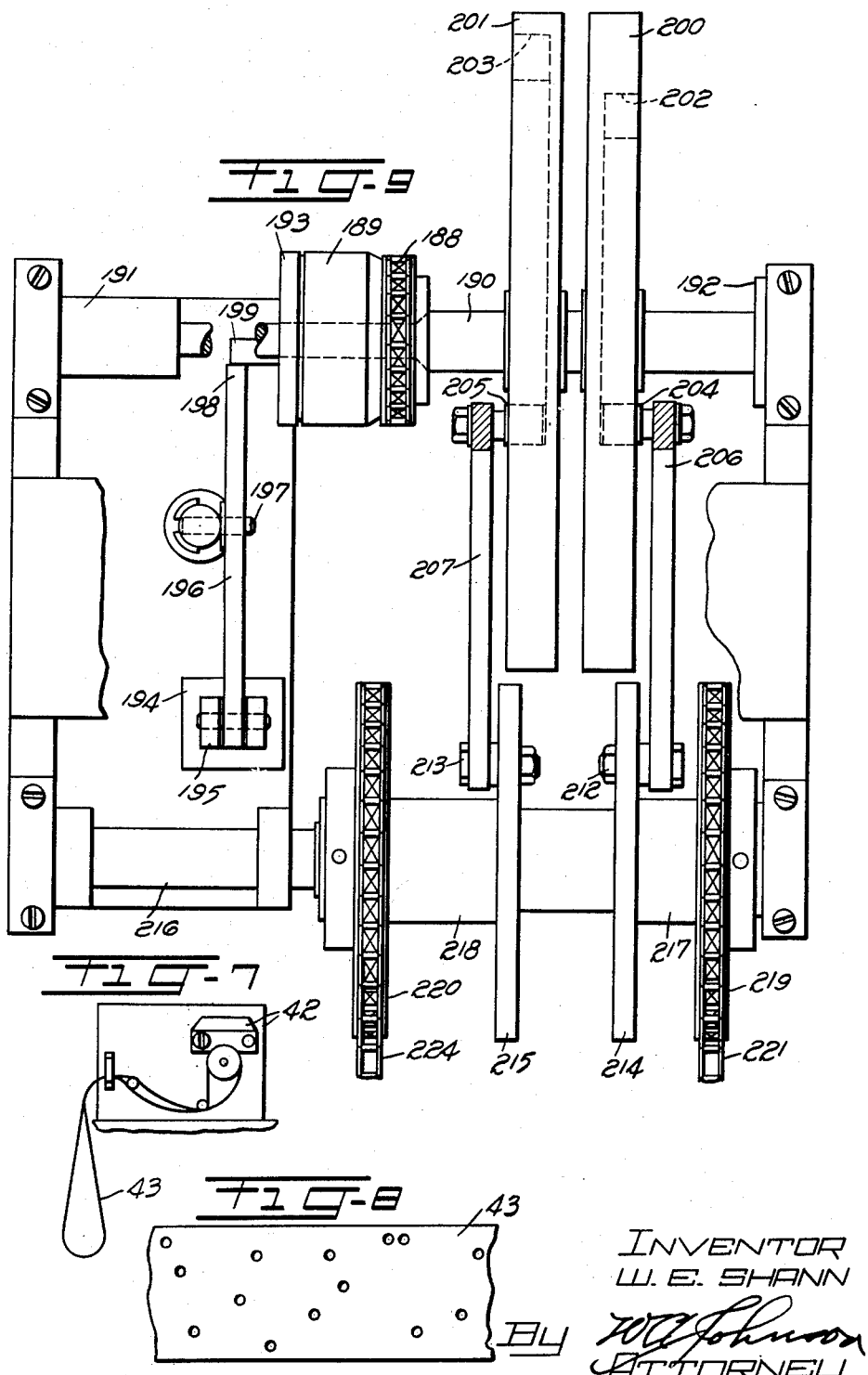
INVENTOR
W. E. SHANN
BY
ATTORNEY

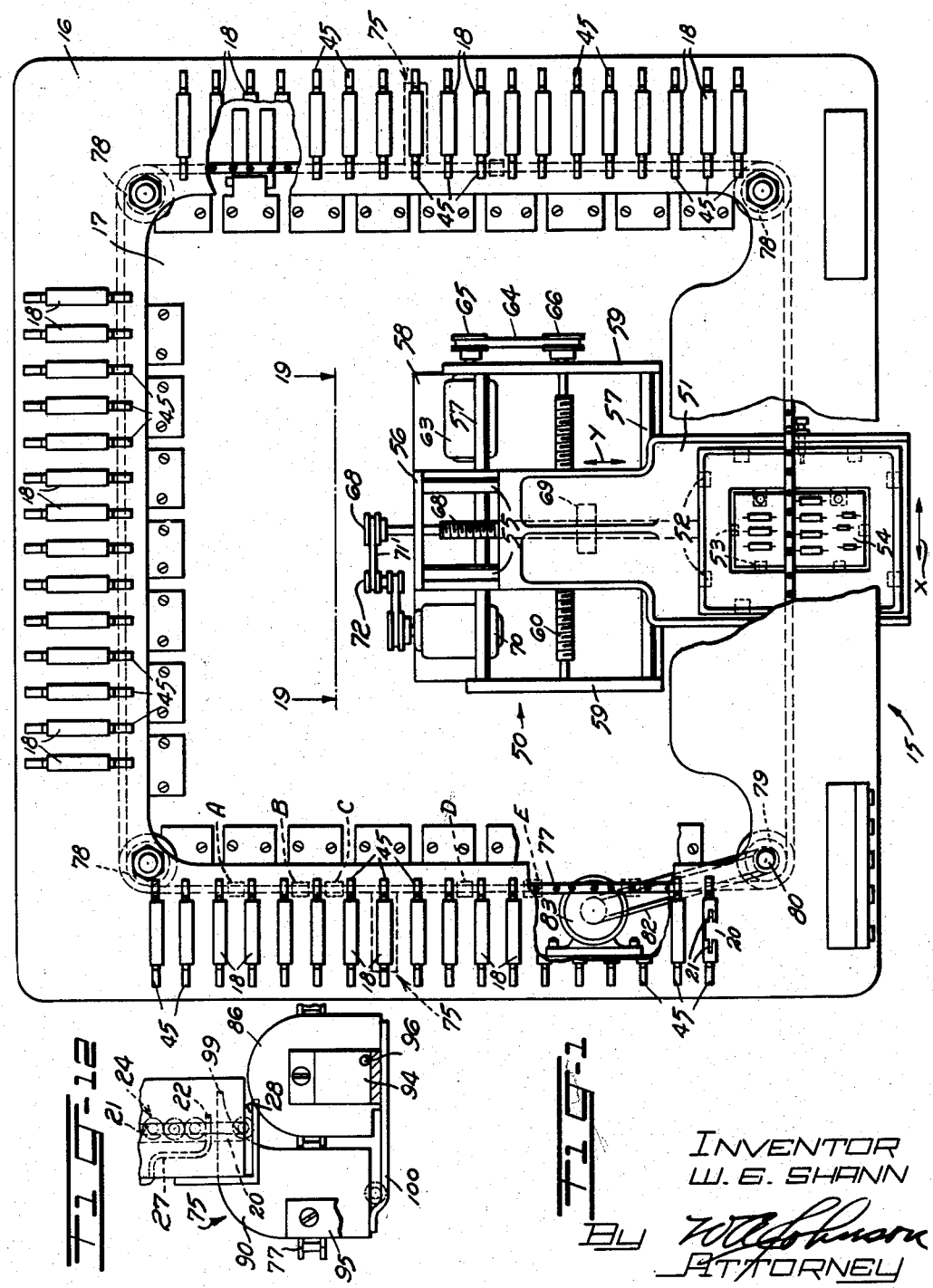

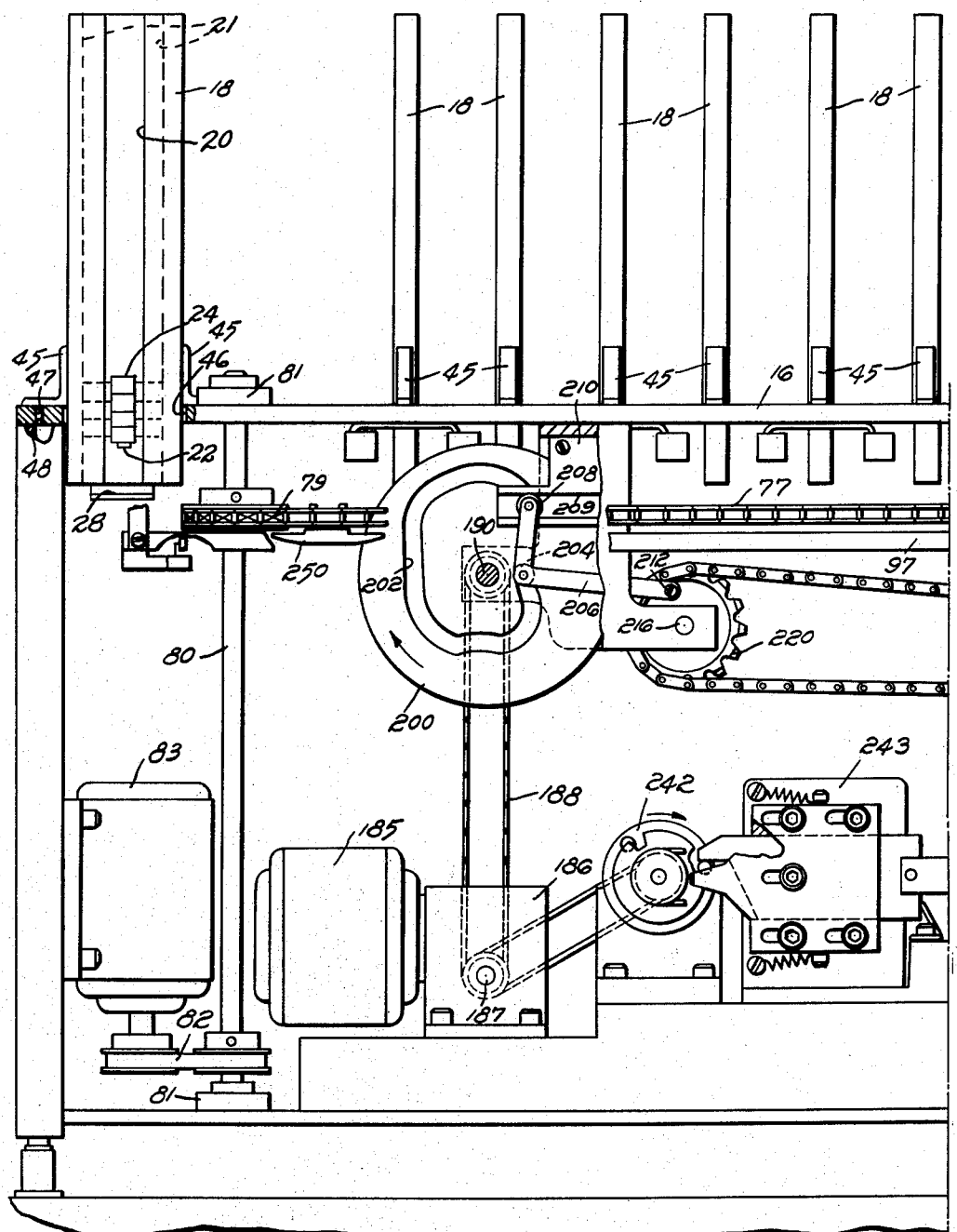

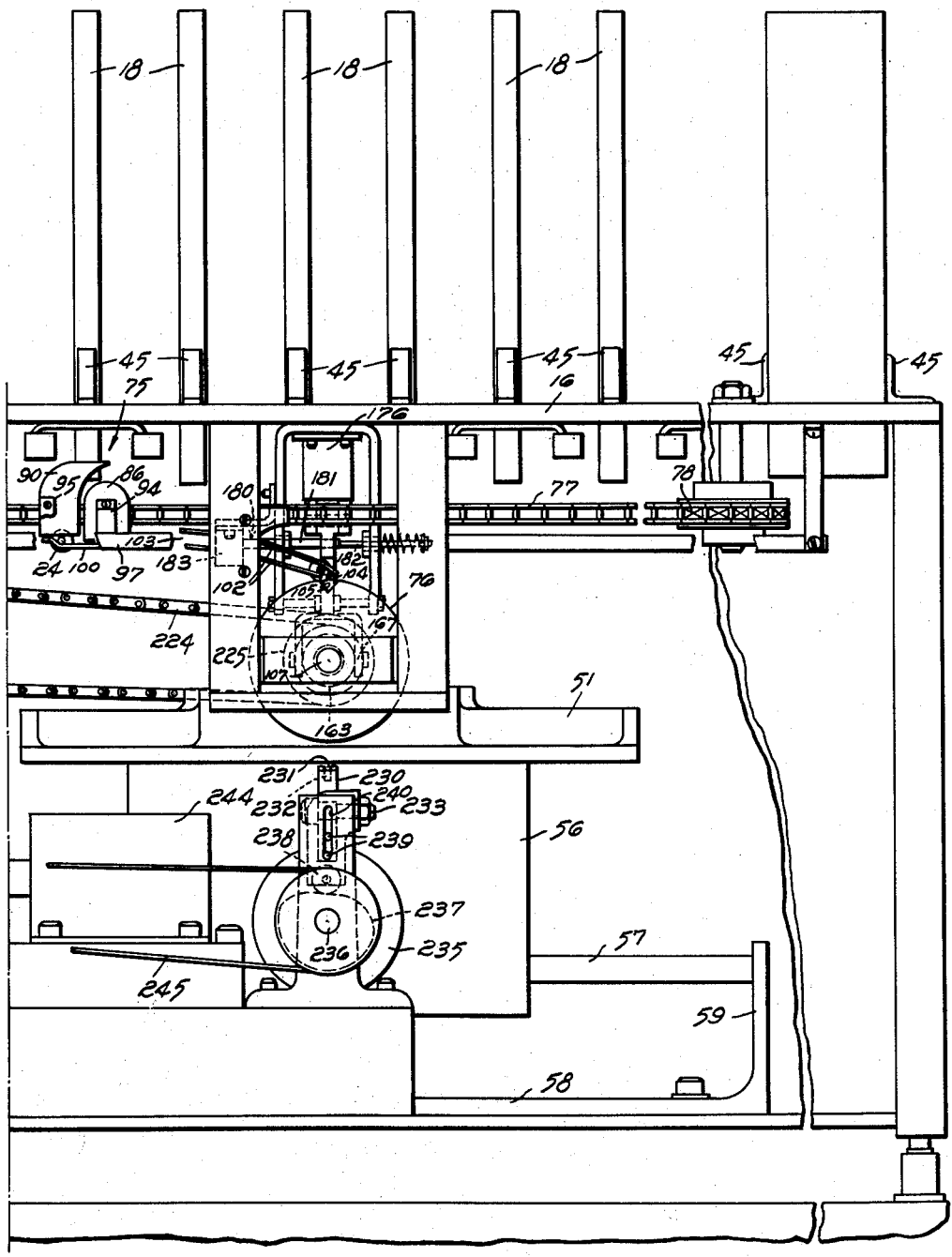

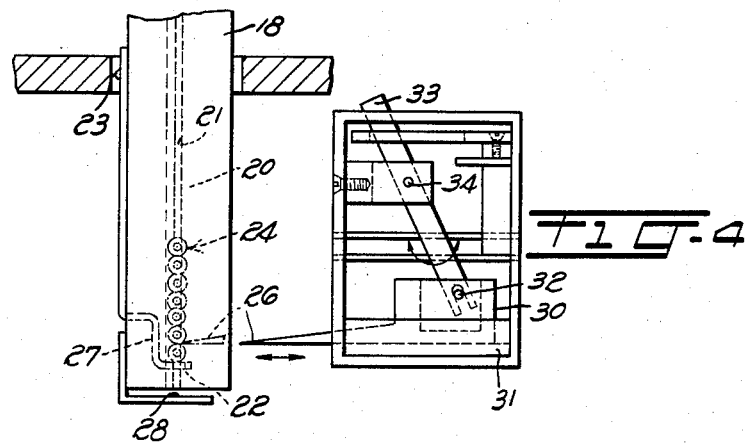
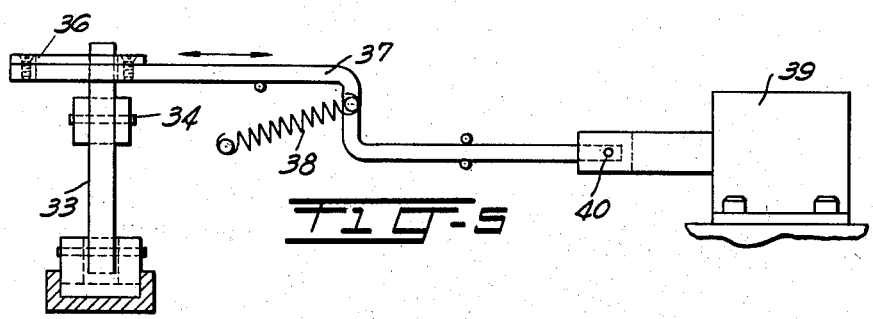
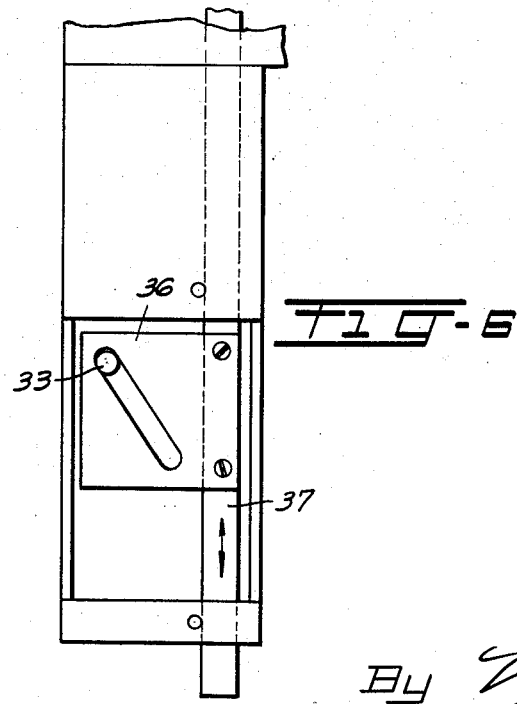

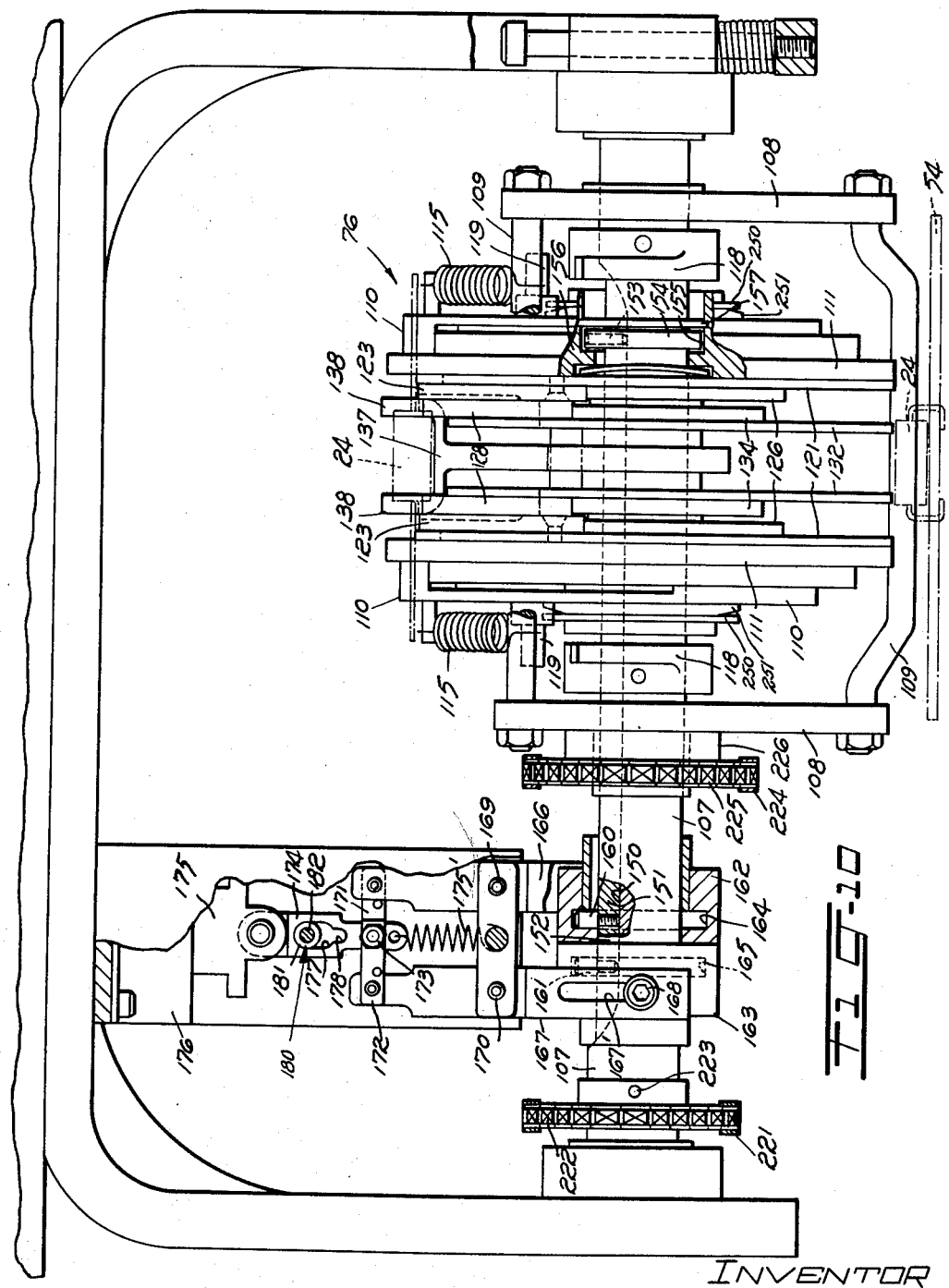

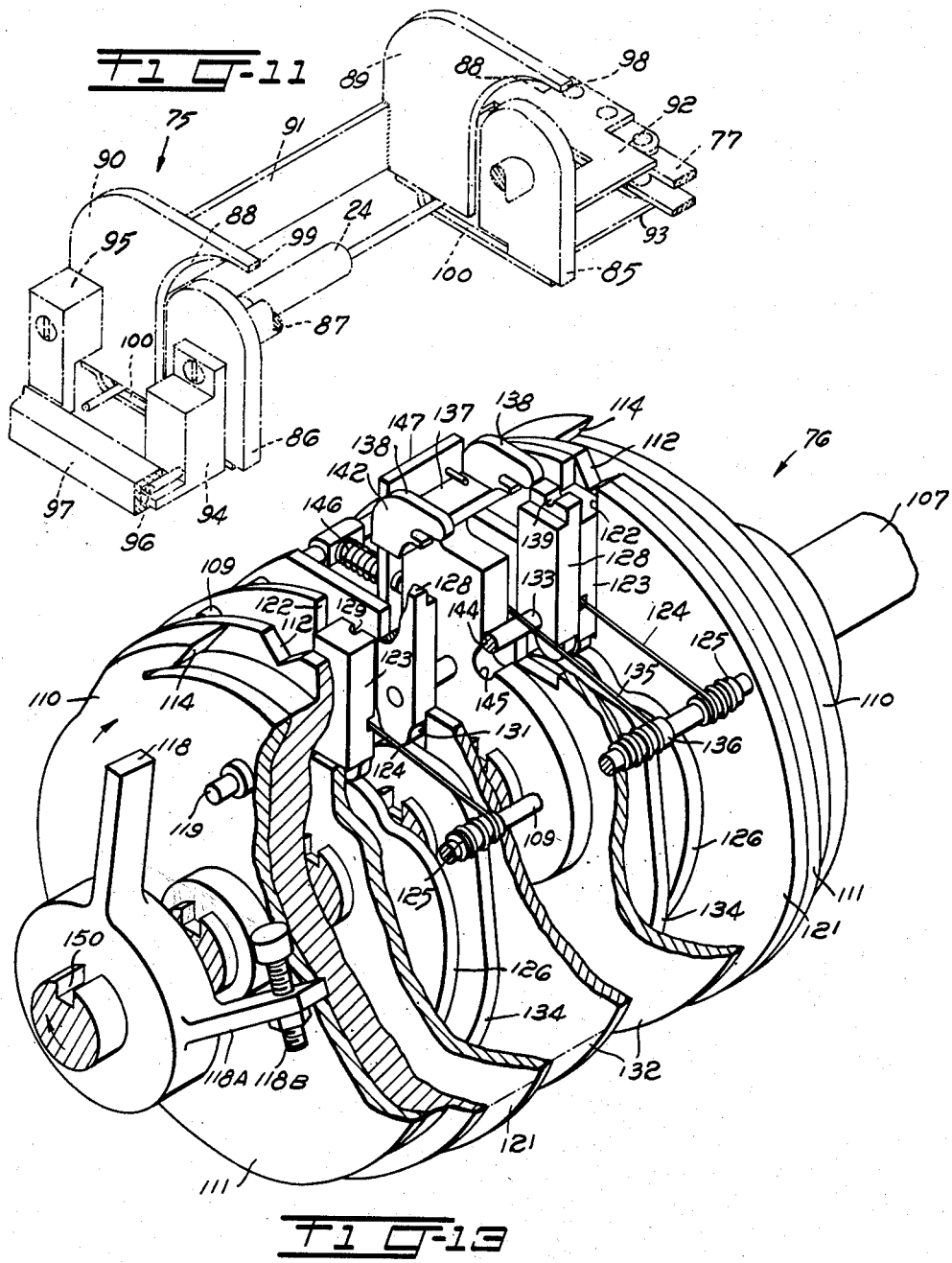

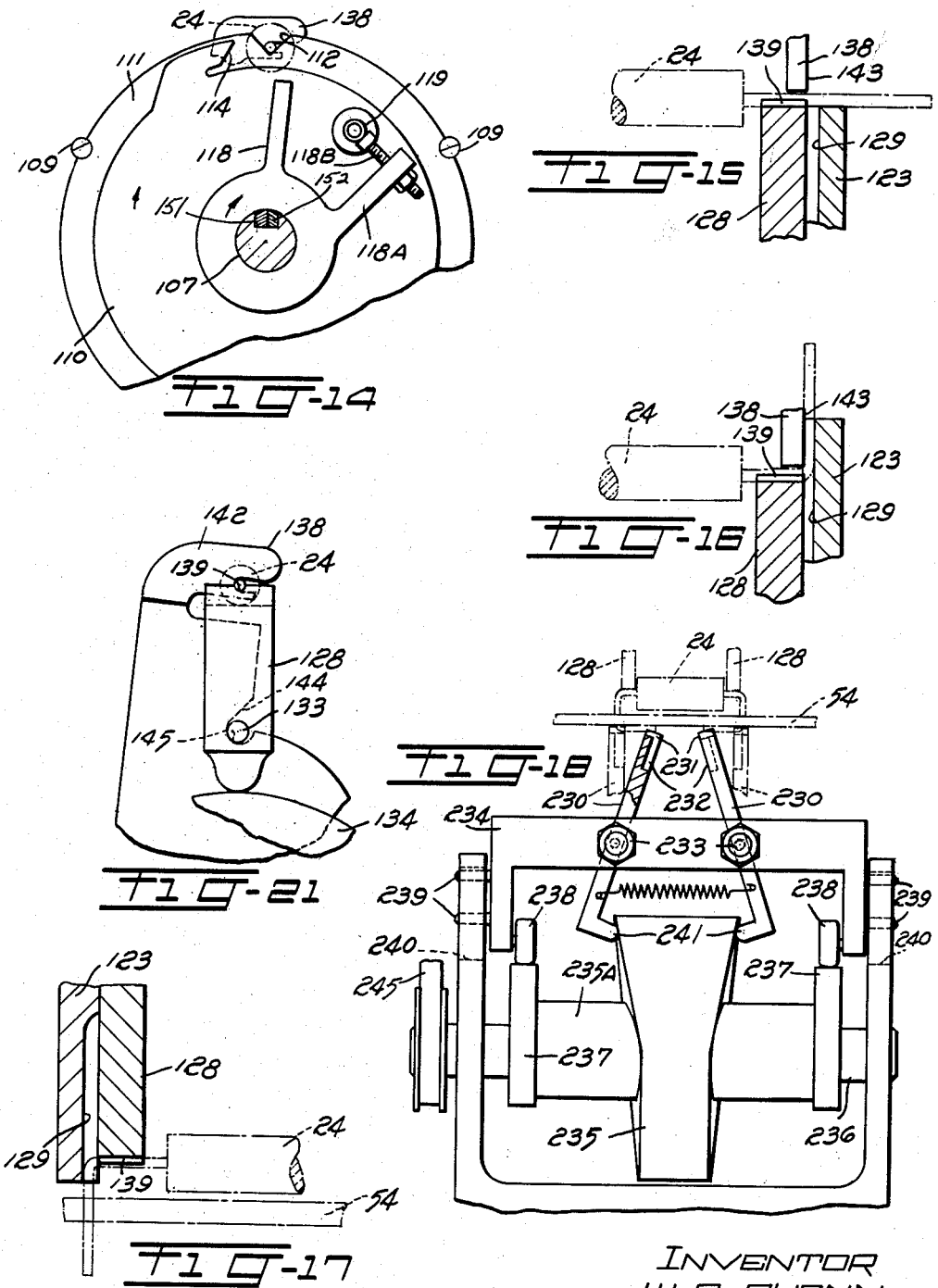

June 8, 1965   W. E. SHANN   3,187,972
APPARATUS FOR AUTOMATICALLY INSERTING
ELECTRICAL COMPONENTS
Filed Feb. 27, 1963   11 Sheets-Sheet 9

INVENTOR
W. E. SHANN
BY
ATTORNEY

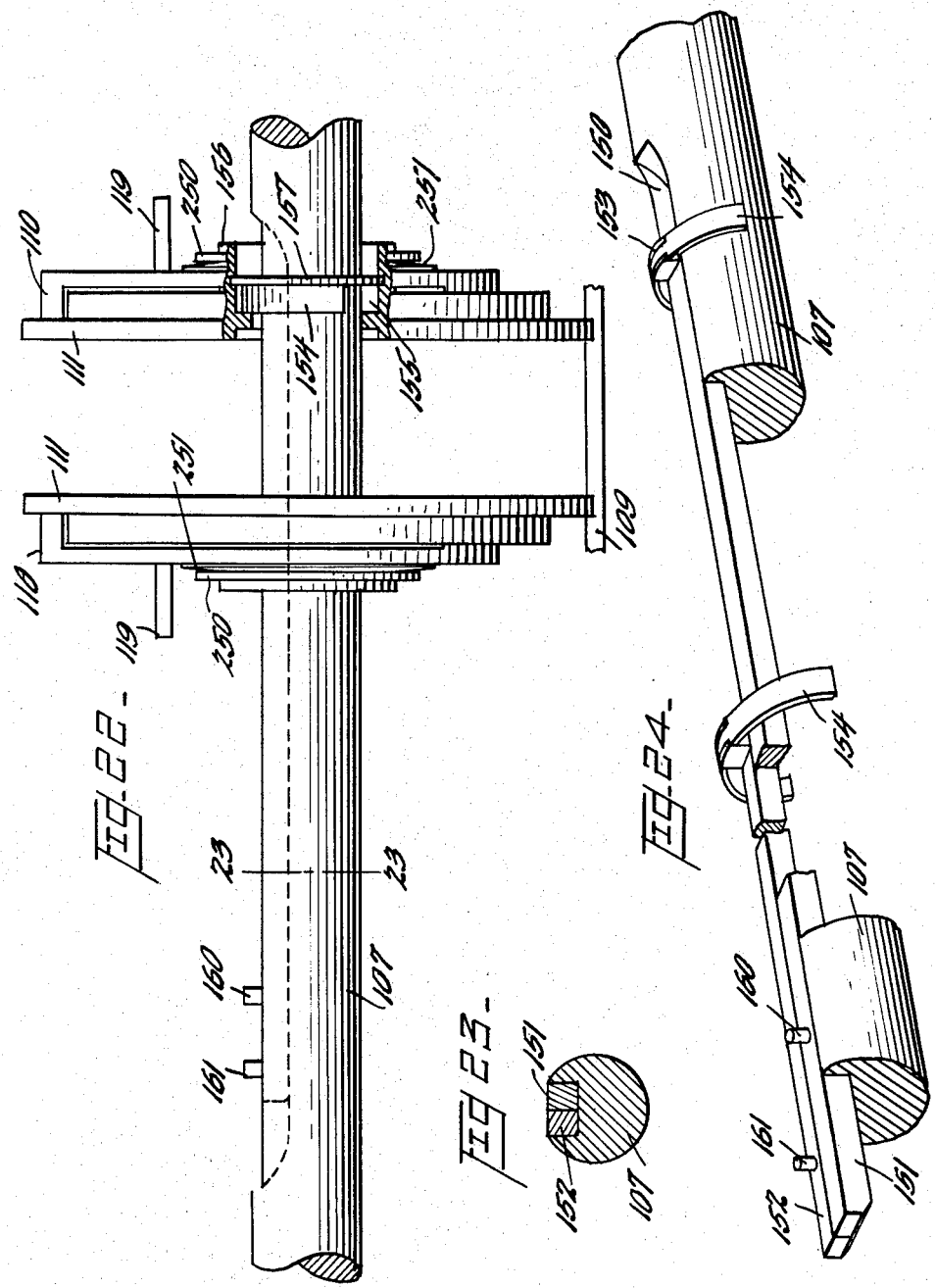

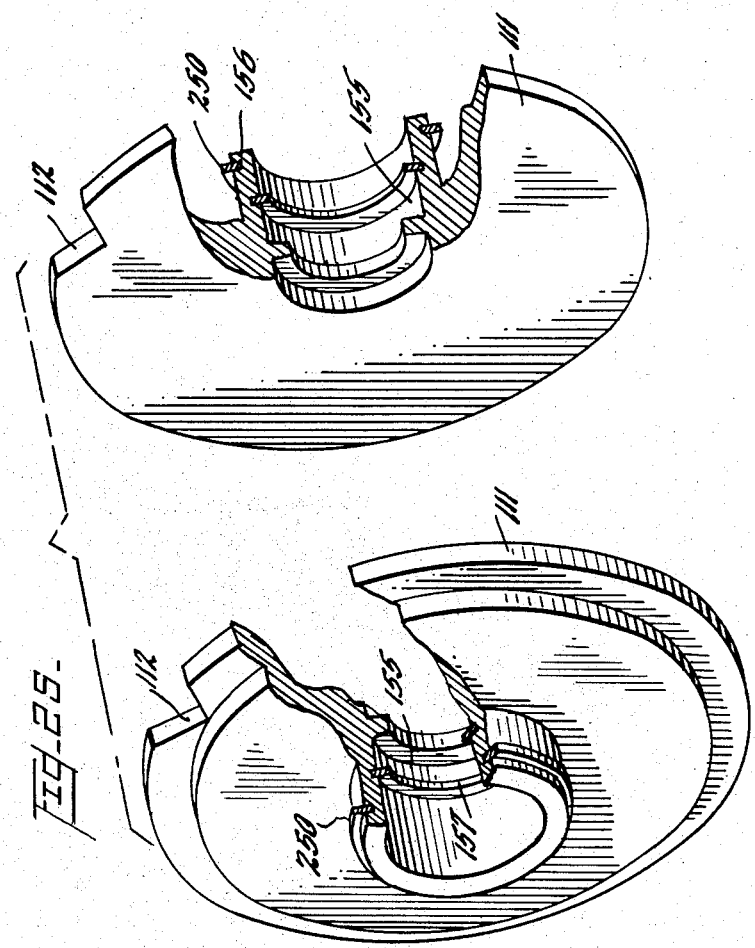

United States Patent Office 3,187,972
Patented June 8, 1965

3,187,972
APPARATUS FOR AUTOMATICALLY INSERTING ELECTRICAL COMPONENTS
William E. Shann, North Andover, Mass., assignor to Western Electric Company, Incorporated, New York, N.Y., a corporation of New York
Filed Feb. 27, 1963, Ser. No. 261,457
9 Claims. (Cl. 227—90)

This invention relates to apparatus for automatically inserting electrical components, particularly resistors and capacitors of general cylindrical shape varying in some instances in cross-sectional dimensions and having axial leads which are to enter pre-punched apertures in printed circuit boards.

Apparatus of this type have been constructed, but due to the increasing demands for greater numbers and varying kinds of components and circuit boards of a varying size and shape, these component inserting apparatus have become outmoded and incapable of use except with the limited types and sizes of circuit boards and their restricted size of electrical components.

An object of the present invention is a completely automatic insertion machine capable of random positioning of components in circuit boards of various sizes.

In accordance with the object, the invention comprises numerous magazines individually adapted to support their respective components in stacked formation and selectively feed them to pick-up positions relative to a given path through which a feeder travels to pick-up the selected components singly and feed them to an operable unit adapted to mount the units successively in pre-arranged locations in a circuit board.

More specifically, the apparatus is under the control of a reader of a perforated tape capable of controlling the entire program for each circuit board for adjusting a servo-positioner carrying each circuit board relative to a mounting position, selecting the component, for each position of the circuit board, to be fed from its respective magazine to the unit and controlling operation of the unit to cut the leads of each component to predetermined lengths, depending on the diameter of the components, subsequently bending the leads, inserting the leads into the apertures of the circuit boards at the mounting position and causing operation of a clinching unit to clinch the leads into engagement with the adjacent circuit of the circuit board.

Other objects and advantages will be apparent from the following detailed description when considered in conjunction with the accompanying drawings, in which:

FIG. 1 is a top plan view of the apparatus portions thereof being broken away;

FIGS. 2 and 3 when placed numerically side by side illustrate a front elevational view of the apparatus;

FIG. 4 is a fragmentary detailed view of a portion of the ejecting means for components adjacent to each magazine;

FIG. 5 is a side elevational view of this ejecting means;

FIG. 6 is a fragmentary top plan view of the structure shown in FIG. 5;

FIG. 7 is a front elevational view of a tape reader, control panel, and perforated tape for controlling the apparatus;

FIG. 8 is a fragmentary portion of the perforated tape;

FIG. 9 is an end elevational view of a portion of the driving means for the operating unit and its cam shaft;

FIG. 10 is a front elevational view of the operating unit;

FIG. 11 is a fragmentary isometric view of the component feeder;

FIG. 12 is a fragmentary end elevational view of the component feeder;

FIG. 13 is an isometric view of the operating unit portions thereof being broken away and expanded for the purpose of illustration;

FIG. 14 is a fragmentary end view of the operating unit;

FIGS. 15, 16 and 17 are fragmentary sectional views of portions of the operating unit in actions on the component and one of the leads thereof;

FIG. 18 is a side elevational view of the lead clinching unit;

FIG. 21 is a side elevational view illustrating the operation of the lead clamping mechanism;

FIG. 22 is a partial side elevational view of the component severing and inserting unit, particularly showing the facilities for axially positioning a pair of cutters;

FIG. 23 is a cross sectional view of the cam shaft showing the facilities for moving the cutters;

FIG. 24 is a perspective view of the facilities for moving the cutters; and

FIG. 25 is a perspective view of a pair of anvils for supporting the component.

Figure 19:
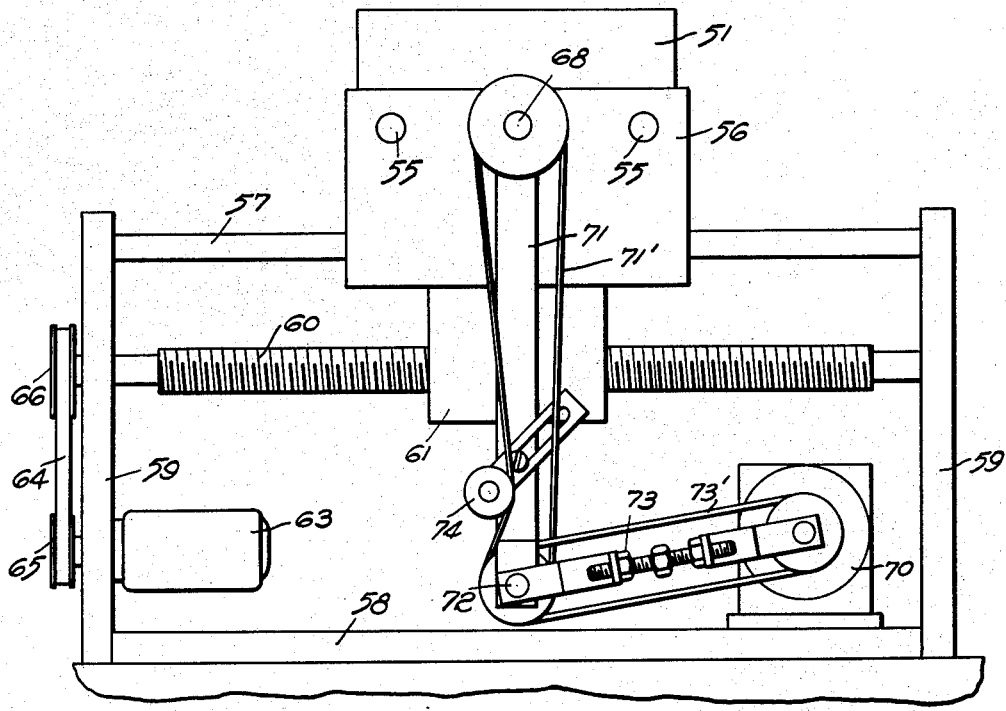
FIG. 19 is an end elevational view of the servo-positioner taken along the line 19—19 of FIG. 1.

The apparatus, as shown in FIGS. 1, 2 and 3, is substantially square in formation with a front indicated at 15 in FIG. 1, the main support 16 having an open center 17. In the present instance, fifty magazines 18 are disposed at equally spaced positions along each side and along the back of the main support. The magazines are identical in structure and are capable of holding up to three hundred components in each magazine. Although there may be fifty different types of components their sizes or cross-sectional dimensions lie within three different areas. The components are disposed in sufficiently large central portions 20 of each magazine and retained in their stacked formation with their axial leads extending through vertical slots 21. Each magazine, as shown in FIG. 4, is provided with a resilient support 22 fixed at 23 and normally extending beneath the stack of components indicated generally at 24. Each magazine is provided with the pickoff structure as shown in FIGS. 4, 5 and 6. A tapered finger 26 is provided for each component in its respective magazine and is actuable from the solid line position shown in FIG. 4 through the broken line position to a point between the bodies of the bottom component and the next above where it will engage an offset portion 27 of its resilient support 22 to move the support free of the bottom component while holding all of the other components in the magazine against downward movement. The bottom component when freed of the support 22, will drop on a platform 28. The leads of the dropped component will rest on the platform 28 until a feeder picks it up and carries it to the operating unit. In the present instance, the finger 26, supported to engage the bodies of the components in their magazine 18, is supported by a slide 30, disposed between guides 31 and connected at 32 to the lower end of a rocker arm 33 pivoted at 34. The rocker arm 33 is shown in FIG. 6, which is a top plan view of the structure shown in FIG. 5. A cam plate 36, for the rocker arm 33, is mounted on a rod 37 for movement toward its normal position away from the magazine by a spring 38, but moved through an operating portion of a cycle by energization of a solenoid 39 to which the rod 37 is connected at 40.

The solenoid 39 for all of the pick off fingers 26 of the apparatus are under the control of a tape reader or reading device 42 FIG. 7, which is responsive to perforations in any one of a group of tapes 43. The tape reader 42 may be identified as an eighty bit block simultaneous perforated tape reader. By this it is meant that the tape reader is of a commercially known type responsive to perforations in a tape having positions for eight rows of holes across its width and responsive to groups of ten lines of these eight positions for simultaneous reading. In the present instance, the first row of holes or perforations control the selection of the component, which is to be inserted in the circuit board while at the same time the second row of holes or perforations control movement of the circuit board through its servo-positioner a predetermined number of 0.1 inch modules along an X-axis and at the same time, the third row of holes gives the information relative to movement of the servo-positioner along a Y-axis for a given number of 0.1 inch modules. Perforations in other rows of the tape cause the tape reader 42 to perform the other operations of the apparatus. Each tape is pre-punched and designated for its particular circuit board so that starting the tape at the proper position in the tape reader 42 with its particular circuit board in position in the apparatus, the series of steps will be followed automatically as each group of ten lines of perforations are presented successively to the tape reader.

The magazines 18, FIGS. 2 and 3, are provided with angle members 45 fixed at like locations to rest upon the support 16 so that lower ends of the magazine may extend through apertures 46 in the support 16 to like locations relative to a given path. Pins 47 fixed to one or more of the angle members 45, are receivable in apertures 48 of the support 16 to assure accurate location of each magazine and adapt them for movement to any desired position on the support. However, the magazines or their respective components must be located at known pre-arranged positions so that the tape 43 may be perforated to actuate predetermined pick off units as shown in FIGS. 4, 5 and 6 to assure the selection of the desired components to be fed in a predetermined order and after the feeding and mounting of the last component in the circuit board, the tape will stop the operation of the apparatus until another circuit board is mounted in the apparatus.

The servo-positioner, indicated generally at 50, FIG. 1, includes a table 51 provided with any desired number of locating members 52 and 53 to be placed in known positions for circuit boards or modules 54 of predetermined variable types and sizes so that through the action of the servo-positioner 50, to move the table along an X-axis identified with the letter X and Y-axis identified with the letter Y, pre-arranged pairs of apertures in the circuit board may be located at a mounting position. The table 51 is mounted for movement along the Y-axis on parallel guides 55 of a carriage 56. The carriage is mounted for movement along the X-axis on parallel rods 57. A platform 58 has vertical members 59 fixedly supporting the ends of the guide rods 57 and rotatably supporting a threaded shaft 60. The threaded shaft 60 extends through an internally threaded nut 61 (FIG. 19), which is fixed to the under portion of carriage 56 to assure movement of the table along the X-axis during rotary movements of the threaded shaft 60. The threaded shaft 60 is operatively connected to a reversible motor 63, mounted on the adjacent member 59, and connected to the threaded shaft through a belt 64 and pulleys 65 and 66. The motor 63 is under the control of the second row of perforations of the tape 43 when the tape is positioned in the reader 42. A threaded shaft 68, rotatably supported by a carriage 56, extends through a nut 69, fixed to the underside of the table 51 to cause movement of the table 51 along its Y-axis during energization of a motor 70 responsive to the third row of perforations in the tape 43 to drive the shaft 68 a predetermined distance in one direction or the other. Due to the fact that the threaded shaft 68 is subjected to lateral movements with the table 51 during driving of the threaded shaft 60 by the motor 63, a special drive must be interposed between the threaded shaft 68 and the motor 70 to permit mounting of the motor 70 on the stationary platform 58 with the other motor 63. By mounting the motors 63 and 70 on the stationary platform 58 all the inertial effects of the weight of the motors, which in this instance is considerable are eliminated. Usually the motors on this type of mechanism are directly coupled to the threaded shaft and are carried along with the carriage. The wiring to the traveling motors presents other problems.

Figure 20:
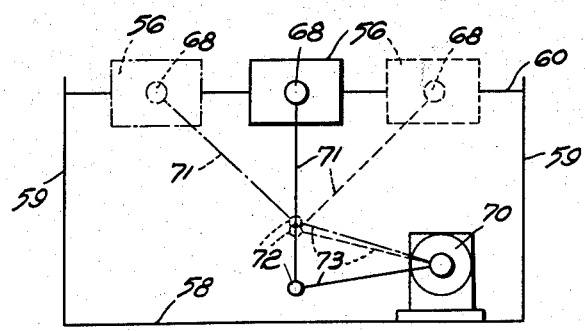
FIG. 20 is a schematic illustration of the actions of one of the drives for the servo-positioner.

The special drive is illustrated in FIGS. 19 and 20. An arm 71 freely supported at its upper end has its lower end pivotally connected through a spindle 72 to one end of an adjustable arm 73, the other end of the adjustable arm being pivotally supported by the shaft of the motor 70. A belt and pulley connection 73′ causes driving of the spindle 72 when the motor 70 is driven in either direction. A belt and pulley connection 71′ causes driving of the threaded shaft 68 when the spindle 72 is driven in either direction. An adjustable idler 74 on the arm 71 keeps driving tension in the belt and pulley connection 71′: FIG. 20 illustrates the adaptability of this special drive during movement of the carriage 56 through driving of the threaded shaft 60.

Two like feeders, shown in FIGS. 1, 3, 11 and 12, indicated generally at 75, are adapted to be moved in a circuitous path beneath the magazines 18 to pick-up the chosen components, two for each circuit of their driving means and feed the components singly to a unit indicated generally at 76. The driving means for the feeders 75 is a chain 77, supported by idler sprockets 78 and a driven sprocket 79. A vertical shaft 80 FIGS. 1 and 2, has its ends journalled in suitable bearings 81 and is operatively connected through a belt drive 82 to a motor 83. The motor 83 is under the control of the tape reader 42 and coordinated with switches A, B, C, D and E of FIG. 1 to control the cycles of the feeder 75. There may be a starting position for each feeder 75 at the right of the unit 76 and in advance of any of the magazines so that the pick-up finger 26 FIG. 4 for the component selected by the tape 43 through the reader 42 will eject said component from its magazine and onto its support 28 prior to the starting of the cycle of each feeder 75. In actual practice, the operation of the various parts of the apparatus may be timed through the reader 42 and switches A to E inclusive so that, if desired, once the apparatus is set in operation for a particular circuit board, the cycles of operation of the feeder may be continuous until all of the components have been selected for that particular circuit board. The functions of the switches A to E inclusive will hereinafter be described.

Referring to FIGS. 11 and 12, the feeders 75 includes members 85 and 86 joined together by a rod 87 and having rounded upper ends to cooperate with curved portions 88 of members 89 and 90 joined by a connecting member 91 exactly like rod 87. The members 85 and 89 are connected to support links 92 and 93 of the chain 77. The member 86 is provided with a member 94 carrying a nylon pin 96 positioned to ride in channel guides 97 positioned substantially parallel with the chain as it moves in its circuitous path. The members 89 and 90 have projections 98 and 99 adapted to extend above the leads of any of the components on the supports 28 FIG. 4 to cause removal of the components from their supports and cooperating with the curved upper ends of members 85 and 86 to guide the leads of the components downwardly onto resilient members 100 mounted on the lower ends of the members 85 and 86 and extending beneath the members 89 and 90. Free ends of the resilient members 100 are urged against the undersurface of the members 89 and 90 to hold the leads of the components in the feeder so that the feeder may carry the component to the unit 76. The unit 76 (see FIG. 3) is provided with two pairs of guides 102 adjacent the front and back of the unit 76 with their entrance ends 103 positioned to straddle the respective ends of the leads of each component approaching the unit 76 so as to remove the component from the feeder and cause it to move toward the unit 76. Outlet ends 104, of the pairs of guides 102, are positioned to cause the leads of the component to drop into notches or recesses 105 of the unit 76.

The unit 76, shown in FIGS. 10, 13, 14, 15, 16, 17, 21, 22, 23, 24, and 25, is supported on a cam shaft 107 for rotation with and relative to the cam shaft. The outermost portions of the unit 76 are heads 108 supported for rotation on the cam shaft 107 and connected by three rods 109 shown in FIGS. 10 and 14. Cutters 110 are free to rotate on the cam shaft and are associated with disc-like anvils 111, mounted for free rotation on the cam shaft but connected, at their peripheries to the rods 109. The rods 109 actually extend through apertures formed in the peripheries of the anvils. The anvils 111, so that the cutter 110 can pass beneath them, have V-shaped notches 112 normally disposed at the receiving position and cooperating with edges 114 of the cutters 110 to bring about cutting of predetermined lengths of the leads of the components during rotation of the cutters 110 relative to the anvils 111. Arms 118, mounted on the cam shaft 107, are adapted to engage projections 119 extending outwardly from the cutters 110 to move the cutters relative to their anvils at predetermined intervals to bring about cutting of the predetermined lengths from the leads.

Positioned inwardly from the anvils 111 in the unit, are discs 121 having parallel radial notches 122 for receiving and guiding formers 123. The formers have notches in their inner surfaces to receive resilient members 124 which extend through the notches and have their ends coiled about sleeves 125 on opposing rods 109 to cause the formers 123 to ride on and be controlled in their radial movements by their respective cams 126, the outer surfaces of the formers 123 ride on the adjacent inner surfaces of the anvils 111, while their inner surfaces ride on the outer surfaces of pushers 128, the inner surfaces of the formers having vertical grooves 129 (see FIG. 16) therein to assist in forming bends in the leads.

The pushers 128 are slidable in parallel notches 131 in discs 132 mounted for rotation on the cam shaft 107 and connected in the unit by the rods 109. The pushers 128 are connected to each other by a pin 133 and are normally urged to ride on their like cams 134 by a resilient member 135 extending over the pin 133 and having their ends spiralled about sleeves 136 deposited on rods 109. The pin 133 controls a clamp 137, which is provided with spaced jaws 138 positioned to cooperate with upper ends of the pushers 128 to secure each component in the unit 76. As shown in FIG. 14 the jaws 138 of the clamp 137 are bifurcated and engage the leads of the component 24, as indicated in FIGS. 15 and 16, adjacent the component and also providing outer surfaces 142 for the jaws 138 to cooperate with the formers 123 to form right angle bends in the leads. After the component has been dropped into the unit 76, the first action is to cause the pushers 128 to move inwardly causing the pin 133 to ride on a cam surface 144 of the clamp 127, which is supported for rotation on the cam shaft, and allow the pin to enter an offset notch 145 in the clamp to free the clamp for movement into holding engagement as shown in FIGS. 10, 14, and 15, through the action of spring 146 against a member 147 normally urging the clamp 137 clockwise into clamping position.

Referring to FIGS. 10, 13, and particularly to FIGS. 22 through 25, there is shown an elongated key-way 150 in the cam shaft 107 having suitable depth and width to receive keys 151 and 152 for longitudinal movement in the key-way relative to each other. The key 151 extends longitudinal of the cam shaft in the key-way 150 to a position where its inner or right end is fixed at 153 to an annular member 154 positioned concentric with the cam shaft and movable thereon. The annular member 154 is positioned in an annular groove 155 of a hub-like portion 156 of the adjacent anvil 111 and held in this position by a retaining ring 157 to operatively connect the adjacent anvil and its cutter 110, which is rotatably supported on the hub 156, to the key 151. An external retaining ring 250 fitted in the hub 156 holds a disk spring 251 to bear against the right-hand cutter 110, thus holding the side of the cutter against the anvil and against axial shifting during the cutting operation. A second retaining ring disk spring is provided to bear against the left-hand cutter. An identical structure such as this which operatively connects the key 151 to the right anvil 111, is provided for connecting the left anvil 111 and its cutter 110 to the key 152. Therefore, with means provided to move the keys 151 and 152 relative to each other like movements may be imparted to the anvils 111 with their cutters 110 relative to each other in the unit 76 to vary the lengths of the excess portions cut from the leads of the components. This means originates with a pin 160, FIG. 10, fixed to the left end of the key 151 and a pin 161 fixed to the left end of the key 152. Collars 162 and 163, disposed concentric with the cam shaft 107, have annular grooves 164 and 165 for their respective pins 160 and 161. A yoke 166, straddles the collar 162, and a yoke 167 straddles the collar 163, the yokes being connected to their respective collars by pins 168 fixed to the collars and positioned in elongated apertures 167' in the yokes. The yokes 166 and 167 are pivotally mounted respectively at 169 and 170 and have their upper ends connected to the outer ends of links 171 and 172. The inner ends of the links are connected to a spindle 173, the spindle being connected to an actuator 174, which is urged normally into the position shown by a spring 175', this being the position where the collars 162 and 163 abut each other to locate the cutters 110 and the anvil 111 at the closest position with respect to each other. The actuator 174 is connected to a core 175 of a solenoid 176 and is provided with an aperture therein having a large portion 177 of a given length and a smaller portion 178 extending beyond one end of the larger portion. The solenoid 176 is responsive to certain areas of each block of the tape and depends upon the presence of perforations in these areas as to whether or not the solenoid 176 remains de-energized to keep the cutters and the anvils of the units 76 in the position shown in FIG. 10 or to move them out to two other known positions.

A control member, indicated generally at 180 (see FIGS. 3 and 10), has a large portion 181 receivable in the larger portion 177 of the aperture in the actuator 174 and a smaller portion 182 receivable in the smaller extension 178 of the aperture. The control member 180 is responsive to a solenoid 183, the core of which is connected thereto. The solenoid 183 is also responsive to the presence or absence of perforations in a certain area of each block of the tape 43 so that the unit 76, particularly the cutters 110 and the anvils 111, may be conditioned for each type of component during the interval in which the feeder is moving through its circuitous path to pick off its selected component. In the present instance, it has been found that the diameter or the cross-sectional contour of the components fall within the following three groups, viz., (1) those with the smallest diameter being conditioned with the unit 76 in the position shown in FIG. 10; (2) those with the next larger diameters are received in the unit after the cutters 110 annd their anvils 111 have been moved outwardly through energization of the solenoid 176 with the control member 180 (FIGS. 3 and 10) in its normal position with the larger portion 181 deposited in the larger portion of the aperture 177 of the actuator 174; or (3) during the energization of the solenoid 176 subsequent to energization of the solenoid 183 to locate the smaller portion 182 of the control member 180 to allow additional movements of the keys 151 and 152 to place the cutters 110 and the anvils 111 further distances apart.

Means are provided to impart predetermined partial rotary movements to the cam shaft 107 and the unit 76 to bring about the operating actions of the unit after receiving a component at what may be defined as the top of the unit. The first action causes closing of the clamp 137 to grip the unit or the leads thereof with the pusher 128, to cut the excess lengths from the leads, to make right angle bends in the leads and provide parallel portions thereof to be received in the pairs of apertures at the mounting position in the circuit board and to move the component with its formed leads through a half cycle to align the leads with the apertures in the circuit board after which the component is moved into its mounting position. This means includes a mechanism shown partially in FIGS. 1, 2, 9 and 10. The power means for this mechanism originates with a motor 185, which is driven continuously to drive a gear reduction unit 186 which has an output shaft 187. A chain connection 188, with the output shaft 187, drives a clutch member 189 FIG. 9. The clutch member 189 is freely rotatable on a shaft 190, which is journaled in suitable bearings 191 and 192 as long as its associated clutch member 193 is held disengaged. The clutch members 189 and 193 compose what is known as a one-revolution clutch under the control of a solenoid 194, which is responsive to switch "D" (see FIG. 1). A core 195, of the solenoid 194, is connected to one end of a lever 196, which is pivoted at 197, the other end 198 of the lever being positioned normally to be engaged by a pin 199 of the clutch 189–193 normally holding the clutch disengaged until the solenoid 194 is energized momentarily to move the end 198 of the lever 196 free of the pin 199 and allowing the clutch members to engage for one operating cycle of the shaft 190. The end 198 of the lever 196 is, upon de-energization of the solenoid 194, positioned to engage the pin 199 to disengage the clutch upon the completion of each operating cycle. Cams 200 and 201 are fixedly mounted on the shaft 190 and are adapted to move through single cycles with each rotation of the shaft 190. The cams 200 and 201 are provided with cam grooves 202 and 203 in sides thereof of particular contours to bring about predetermined operations respectively of the cam shaft 107 and the unit 76. Each cam has a follower in the form of a roller identified respectively as 204, and 205, carried by levers 206 and 207. As shown in FIG. 2, the levers 206 and 207 are of the bell-crank type, the intermediate portions carrying the cam followers 204 and 205 whereas the upper ends in FIG. 2 carry rollers 208, which ride in grooves 209 of members 210 fixed to the support 16. Only one of these structures is shown in FIG. 2, but it should be understood that the levers 206 and 207 are of like formation and provided with like members 210. The other ends of the levers 206 and 207 are pivotally connected at 212 and 213 to discs 214 and 215 which are free to rotate on a shaft 216, but are secured through hubs 217 and 218 to their respective sprockets 219 and 220, the sprockets also being free to rotate on the shaft 216. A chain 221 extending around the sprocket 219 extends around a sprocket 222 FIG. 10, which is fixedly mounted at 223 to the cam shaft 107. The sprocket 219 is selected to be larger than the sprocket 222 so that a partial rotation of the sprocket 219 results in a 405-degree rotation of the sprocket 222 and the cam shaft 107. A chain 224 extending around a sprocket 220 FIG. 9 also extends around a sprocket 225, which is fixed to a hub 226 integrated with the adjacent head 108 of the unit 76. The sprocket 220 is selected to be larger than the sprocket 225 so that a partial rotation of the sprocket 220 results in 180-degree rotation of the sprocket 225. Through this mechanism and during each cycle of operation of the shaft 190 FIG. 9, particular functions of the unit 76 are carried out through the driving actions on both the cam shaft 107 and the unit 76 to process each component and insert it in its particular location in the wiring board.

After each component has been inserted in the wiring board with its leads extending through the aperture at the mounting position, a clinching unit shown in FIGS. 3 and 18 is operated to clinch the ends of the leads into engagement with their respective circuit portions. The clinching unit includes companion clinching tools 230 having notches 231 in the upper ends thereof comparable in size to the leads of the components and vertical or longitudinal grooves 232 open to the notches 231 to receive the leads of each component as they are moved through the apertures in the wiring board. The clinching tools 230 are pivotally supported at 233 on a carriage 234 and are under the control of a cam 235 fixedly mounted on a spacer 235A which is keyed to cam shaft 236. The cam shaft also carries cams 237 upon which cam followers 238 of the carriage 234 are caused to ride. Pairs of guide pins 239 extending outwardly from each side of the carriage 234 are caused to ride in elongated apertures 240 to serve as guides for the carriage and particularly guides for the clinching tools 230 in their movement upwardly to engage the leads of the successive components or to position the grooves 232 of the clinching tools to receive the leads of the component as they are moved through the apertures of the circuit board 54. The cams 237 are of contours adapted to move the carriage into the upper position and hold it for a given length of time while the cam shaft 236 continues to rotate to cause the high portions or the thicker portion of the cam 235 to engage the inner ends 241 of the tools 230 and move them from the broken line position to the solid line position causing clinching of the ends of the component leads. A driving means for the clinching unit originates with the motor 185, which is rotated continuously to provide a continuous driving for the input end of a one-revolution clutch 242. The clutch 242 is under the control of a clutch release unit 243 FIG. 2, which is operated at predetermined intervals by a solenoid 244, which is energized under the control of a time delay circuit started by switch "D," to cause driving of the cam shaft 236 through a belt and pulley connection 245.

Although the electrical circuits for the switches A, B, C, D and E of FIG. 1 are not shown it should be understood that the functions of the switches are as follows:

Switch A is operated to stop chain 77 if unit 76 is in motion and has not finished its cycle.

Switch B causes dropping of old and reading of new tape information.

Switch C functions in the dropping of all components except the first component for the board and those in magazines 20 through 25, numerically arranged.

Switch D functions at the start of insertion and stops chain 77 at the end thereof for each board.

Switch E functions in the dropping of the first component selected and those of magazines 20 through 25, numerically arranged.

Switch actuators 250 follow their respective feeders 75 and causes operation of the switches A to E inclusive in their respective order to establish the aforementioned functions. The actuators are of the contour shown (FIG. 2) and fixed to links of the chain 77. The switches are supported on a fixed bracket beneath the chain.

*Operation*

Let it be assumed that one of a group of circuit boards is positioned on the table 51 FIG. 1 and that its corresponding tape 43 has been located in the reader 42. The tape will contain successive blocks including 10 lines of the eight rows for perforations, these blocks being separated from each other so that through conventional means after the operation of a start switch, not shown, the tape may move in the reader for the registration of the first block of perforations to carry out the selection of a predetermined one of the fifty different types of components. If the component is of the intermediate or larger size the unit 76 is conditioned for that particular component selected, by locating the anvils 111 and the cutters 110 for subsequent cutting of excess lengths from their leads depending upon the cross-sectional contour of the selected component. It should be understood that in numerous instances, the positions of the anvils 111 and the cutters 110 of the unit 76 may remain unchanged this depending upon a group of successively selected components of like cross-sectional contours or diameters. Once the operation has started for the first component, the solenoids 39 FIG. 5 will be energized to cause the finger 26 to be operated as illustrated in FIG. 4 to move to the left beneath the next to the bottom component in that particular magazine 18 to move the resilient member 22 to the left a distance sufficient to release the bottom component to drop onto the platform 28, after which the finger 26 returns to the normal position allowing the support 22 to move beneath the stack of components in the magazine and hold them until the next selection of this particular type of component. With the selected component or its leads resting on the platform 28, one of the feeders 75, FIGS. 3, 11 and 12, being moved through the path by the chain 77 will pick off the component as illustrated in FIG. 12 and cause it to drop onto the resilient members 100. FIG. 12 illustrates not only the picking off of a component but its position on the resilient members 100. Actually, there should not be two components in the feeder at one time. Each feeder 75 moves with the leads of the component on the resilient members 100 throughout its circuit to a starting position and in doing so, carries the component so that its leads are moved between the pairs of guides 102 FIG. 3, which are to remove the component from their resilient members 100 and cause the component to move into the unit 76. The exit ends 104, of the guides 102, direct the leads to enter the V-shaped notches 112 of the anvils 111. When the component enters the unit 76 with the unit in its normal position shown in FIGS. 10 and 13, the clamp 137 is open and the grooves 139 of the pushers 128 are positioned to receive the leads of the component. At this time, the clutch member 193 (FIG. 9) will be released through energization of the solenoid 194 to bring about one cycle of operation of the cam shaft 190 with its cams 200 and 201. The contours of the cam grooves 202 and 203 are such that during one complete cycle thereof several operating performances are carried out in successive steps as follows:

(I) Cam shaft 107 rotates 135° while unit 76 is held stationary. During this interval, cams 134 are operated to allow the pushers 128, under force of spring 135, to move inwardly to move the pin 133 into the notch 145 of the clamp 131 so that the spring 146 may move the clamp into closed position with the jaws 138 extending over and firmly engaging the leads in the notches 139 of the pushers 128. Cams 118 will be operated then to engage pins 119 to move the cutters 110 relative to the anvils 111 to cut excess lengths from the leads.

(II) Formers 123 are positioned by cams 126 to engage the leads.

(III) Cams 134 continue to cause pushers to hold leads against jaws 138 of the clamp 137. Continued rotation of shaft 107 relative to unit 76 causes outward movement of the formers 123 to form their right angle bends in the leads and to locate the parallel portions known distances from each other. These bending formations are against the outer surfaces 142 of the jaws 138 of the clamp 137. At the end of the forming operation, the leads are held by the formers 123 in the grooves 129 FIGS. 15 and 16 regardless of any movement of the pushers 128 and the jaws of the clamp 137.

(IV) When the cam shaft 107 reaches 135° in its rotary movement the unit 76 moves with it until the cam shaft has completed a 315° turn from its starting position and unit 76 has turned 180° and comes to a stop. During this interval, there is no action in the unit 76 as there is no relative movement of the cam shaft and the unit. As the shaft continues to turn, the cams 126 cause the formers 123 to move outwardly, which in the present instance is directly downwardly while at the same time, the pushers 128 are moved outwardly by their cams 134 causing the pin 133 to swing the jaws 138, of the clamp 137, out of registration with the leads of the component. The unit 76 is held at the 180° position where it aligns the formed leads of the component with the pair of apertures of the circuit board 54, which have been previously located at their mounting position to receive the first component.

(V) At this time, the continued motion of the cam shaft, and with the clamp 137 open, the formers 123 and the pushers 128 are moved by their cams to the maximum outer or down position, locating the component on the circuit board and inserting its leads in the pair of apertures at the mounting position.

Cam shaft 107 continues to rotate to a 225° position relative to unit 76 or 405° including the rotation with the unit 76 to complete insertion of the leads of the component and to hold the component and the leads thereof during operation of the clinching unit shown in FIG. 17 which clinches the leads extending beneath the circuit board into engagement with the adjacent circuit thereof.

(VI) Cam shaft 107 and the unit 76, are moved in the reverse direction and return to their starting positions ready to receive the next component.

At the start of the operating cycle for the first component certain impulses are received from the tape reader to operate the motors 63 and 70 FIG. 1 of the servo-positioner to move the table a designated number of units, that is, 0.1 inch modules along either or both of the X-axis and the Y-axis to locate the pair of apertures in the circuit board for the first component. Similar operations are performed for the successive components, these actions being responsive to the perforations in the second and third rows in each block of the tape 43. These operations are carried out automatically through the pre-arranged selection of the blocks of perforations in the tape corresponding to their particular type of circuit board and moving the apparatus automatically through successive operations for the selection of the successive predetermined components to bring about, not only the automatic adjustment of the servo-positioner to locate the particular pairs of apertures in the circuit board in the mounting position, but to also pre-condition the unit 76 to cut the leads to the desired lengths varying with the components of different sizes and operating the unit 76 and the cam shaft 107 at controlled intervals to bring about the actual cutting of the leads, the formations thereof and the insertion of the leads in the circuit board.

It is to be understood that the above described arrangements are simply illustrative of the application of the principles of the invention. Numerous other arrangements may be readily devised by those skilled in the art which will embody the principles of the invention and fall within the spirit and scope thereof. Although the apparatus is defined as receiving and mounting components in wiring boards singly a plurality of wiring boards may be serviced simultaneously or successively.

What is claimed is:

1. In an apparatus for bending leads extending from a component and for mounting said leads in a pair of spaced apertures formed in a circuit module,
    a rotatably mounted unit having slidably mounted facilities for supporting inner sections of said leads and said component at a position spaced from said circuit module,
    a pair of benders slidably mounted on said supporting facilities for movement radial to said unit to bend the leads radially outward from said facilities,
    means for sliding said benders to bend the leads extending from said component,
    means rendered effective upon completion of movement of said benders for rotating said unit to move said bent leads into alignment with said spaced apertures in said circuit module, and
    means rendered effective upon completion of the rotation of said unit for sliding said facilities to insert leads into said apertures.

2. In an apparatus for inserting leads axially extending from an electrical component into a pair of spaced apertures formed in a circuit board,
  a rotating cam shaft,
  a frame unit rotatably mounted on said cam shaft,
  a drive means for rotating the frame unit independently of the cam shaft from a load position to an inserting position, a pair of pushers slidably mounted in said frame unit for supporting said leads,
  a spring urged clamp for gripping said leads on said pushers,
  means on said pushers bearing against said clamp for holding said clamp from engaging said leads,
  a cam on said cam shaft for moving said pusher inwardly of said frame unit while said frame unit is in the load position to move said holding means to release said spring urged clamp to grip said leads and for subsequently moving said pusher outwardly to release said clamp and move said leads radially outward from said unit while said frame unit is in the inserting position to advance said leads toward said circuit board,
  a pair of benders slidably mounted in said unit for bending the leads gripped by said clamp, and
  a cam on said shaft rendered effective following operation of said clamp for moving said benders to bend said leads while said frame unit is in the load position whereupon said bent leads are advanced into the apertures by the pushers when said frame unit rotates to the inserting position.

3. In a device for bending and inserting leads axially extending from a component into a pair of spaced apertures formed in a circuit module,
  a cam shaft,
  a unit rotatably mounted on said cam shaft,
  a pair of pushers slidably mounted in said unit for radial movement,
  said pushers having a pair of grooves formed at their outer extremities for receiving and supporting the leads of a component, with the ends projecting beyond said grooves,
  a spring biased clamp pivotally mounted in said unit for gripping said leads positioned in said grooves,
  a pair of forming members slidably mounted in said unit and on said pushers for bending the ends of the leads extending beyond said grooves,
  a first cam on said cam shaft for radially moving said forming member to bend said projecting portions of said leads,
  means for rotating said cam shaft to render said first cam effective to bend said leads to extend radially from said unit,
  means rendered effective following movement of said forming members to bend said leads for rotating said unit to position said pushers and said bent leads in alignment with said apertures,
  a second cam on said rotating cam shaft rendered effective upon completion of the movement of said unit for moving said pushers to advance the bent leads into said apertures, and
  means actuated by the movement of the pushers for moving said spring biased clamp from engagement with the leads.

4. In an apparatus for trimming and bending a pair of leads extending from an electrical component,
  a rotating cam shaft,
  a pair of cutters rotatably mounted on and with respect to said cam shaft,
  a pair of anvils rotatably mounted on and with respect to said cam shaft for supporting said leads,
  a pair of benders interposed between said anvils and mounted for radial movement with respect to said cam shaft,
  means between benders for clamping said leads,
  means on said cam shaft for rotating said cutters relative to said anvils to sever the ends of the leads projecting beyond said anvils, and
  means on said cam shaft rendered effective following operation of said cutters for radially moving said benders to bend the lead projecting from said clamping means.

5. In an apparatus for trimming and inserting leads axially extending from a circuit component in apertures formed in a circuit module,
  a frame unit mounted for rotation,
  means slidably mounted in said unit for supporting the leads,
  a cutting means rotatably mounted within said unit,
  means for rotating said cutting means relative to said supporting means to trim the extremities of the leads extending beyond said supporting means,
  means within said unit rendered effective following operation of said cutting means for bending said leads to extend radially of the axis of rotation of said unit,
  means actuated after the operation of said bending means for rotating said unit to move said radially projecting bent leads into alignment with said apertures, and
  means rendered effective following rotation of said unit for sliding said support means to advance the ends of said bent leads into said apertures.

6. In an apparatus for inserting a component having a pair of axially extending leads into a circuit board having a pair of spaced apertures,
  a rotatably mounted unit having a pair of spaced anvils for receiving said leads,
  a pair of spaced pushers slidably mounted in said unit and interposed between said anvils for supporting said leads,
  means for selectively clamping said leads to said pushers,
  a pair of bending elements slidably mounted on said pushers and respectively interposed between said pushers and anvils,
  a pair of cutters rotatably mounted in said unit to subtend said anvils,
  means for rotating said cutters relative to said unit and anvils to sever the projecting ends of said leads,
  means rendered effective following operation of said cutters for moving said bending elements relative to pushers to bend the leads extending from said pushers,
  means for rotating said unit to move said pushers and said bent leads into alignment with said apertures, and
  means rendered effective upon completion of the rotation of said unit for advancing said pushers and for releasing said clamping means to advance said bent leads into said apertures.

7. In a device for bending and inserting leads extending from a component into a module having receiving spaced apertures,
  a shaft,
  means for rotating said shaft,
  a pair of spaced support means mounted for movement about said shaft and radially of said shaft and having means for receiving sections of said component leads,
  means for selectively clamping sections of said leads in said groves to said support means,
  means operated by the rotation of said shaft for operating said clamping means,
  a pair of cutters rotatably mounted on said shaft and positioned adjacent said support means,
  means on said shaft rendered effective upon operation of said clamp means for moving said cutters to sever said leads,
  bending means interposed between said cutting means and said support means and mounted for radial movement with respect to said shaft, means on said shaft rendered effective upon operation of said cutting means for radially moving said bending means to bend said end section of said leads at right angles to the section of the leads clamped in said supporting means, means for rotating said support means into an inserting position in alignment with the apertures in said module, and means on said shaft rendered effective upon advance of said shaft for radially moving said support means to advance said leads into said apertures.

8. In an apparatus for trimming and bending a pair of leads axially extending from a component, a rotating cam shaft having an elongated longitudinal slot, a pair of spaced cutters mounted on said cam shaft for rotational and longitudinal movement with respect to said cam shaft, a pair of anvils rotatably mounted on said cam shaft and positioned adjacent to said cutters for supporting the leads extending from said component, a pair of spaced bending elements slidably mounted between said anvils for radial movement with respect to said cam shaft, means between said bending elements for clamping said leads to project past said benders and anvils into the path of rotation of said cutters, means extending through said slot for longitudinally moving said anvils and cutters along said cam shaft, means connected to said cam shaft for rotating said cutters past said anvils to sever said leads, and means on said cam shaft rendered effective following operation of said cutters for radially moving said bending elements.

9. In an apparatus for trimming, bending, and inserting leads axially extending from a component into a circuit module, a frame unit mounted for rotation, a cam shaft extending axially through said frame unit for movement relative to said unit, said cam shaft having a longitudinal slot, a pair of trimming devices mounted in said frame unit and on said cam shaft, each having an anvil and a rotatable cutter mounted for longitudinal movement along said cam shaft, support means slidably mounted in said frame unit for radial movement, and for supporting the leads of said component to extend past said anvils, means extending through said slot for selectively moving said trimming devices toward and away from each other, means for rotating said cam shaft within said frame unit, means operated by said rotative cam shaft for rotating said cutters relative to said anvils to trim the sections of the leads extending past said anvils, a pair of benders movably mounted within said frame unit for bending the trimmed leads, means operated by said rotating cam shaft and rendered effective following operation of said cutter for moving said benders to bend said leads, means for rotating said frame unit to position said bent leads in alignment with the apertures in said module, and means on said cam shaft rendered effective upon rotation of said frame unit for sliding said support means to advance said bent leads into said apertures.

References Cited by the Examiner

UNITED STATES PATENTS

| | | | |
|---|---|---|---|
| 2,537,480 | 1/51 | Nasmith et al. | |
| 2,856,998 | 10/58 | Hancock | 1—323 X |
| 3,001,198 | 9/61 | Vossen | 1—323 |
| 3,078,466 | 2/63 | Harrold et al. | 1—323 |

GRANVILLE Y. CUSTER, Jr., *Primary Examiner.*

UNITED STATES PATENT OFFICE
CERTIFICATE OF CORRECTION

Patent No. 3,187,972                                                June 8, 1965

William E. Shann

It is hereby certified that error appears in the above numbered patent requiring correction and that the said Letters Patent should read as corrected below.

Column 5, lines 9 and 10, for "peripheries of the anvils. The anvils 111, so that the cutter 110 can pass beneath them, have V-shaped notches" read -- peripheries of the anvils so that the cutter 110 can pass beneath them. The anvils 111 have V-shaped notches --; column 6, line 57, for "annd" read -- and --.

Signed and sealed this 24th day of May 1966.

(SEAL)
Attest:

ERNEST W. SWIDER                                      EDWARD J. BRENNER
Attesting Officer                                              Commissioner of Patents